United States Patent Office 2,916,061
Patented Dec. 8, 1959

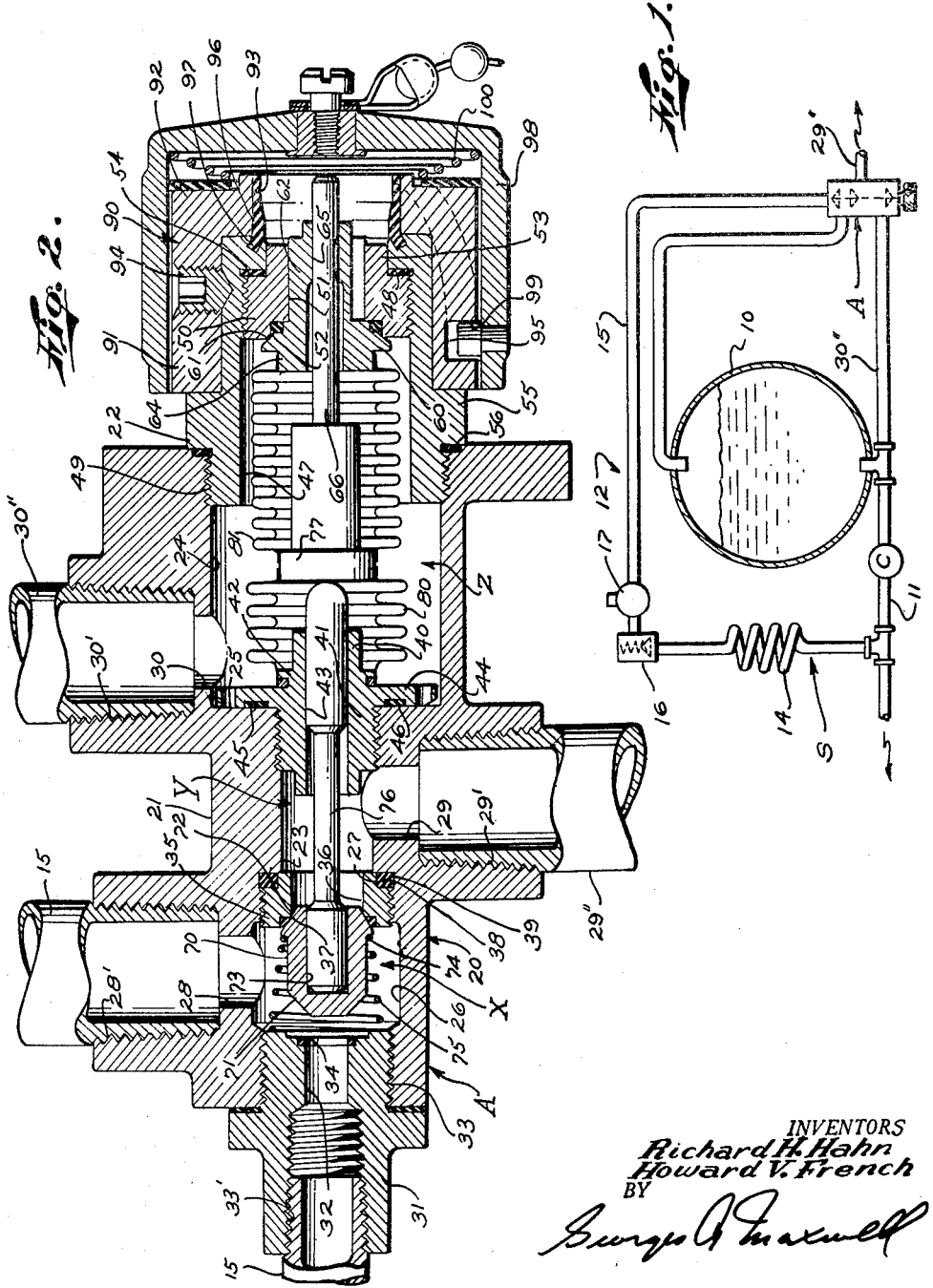

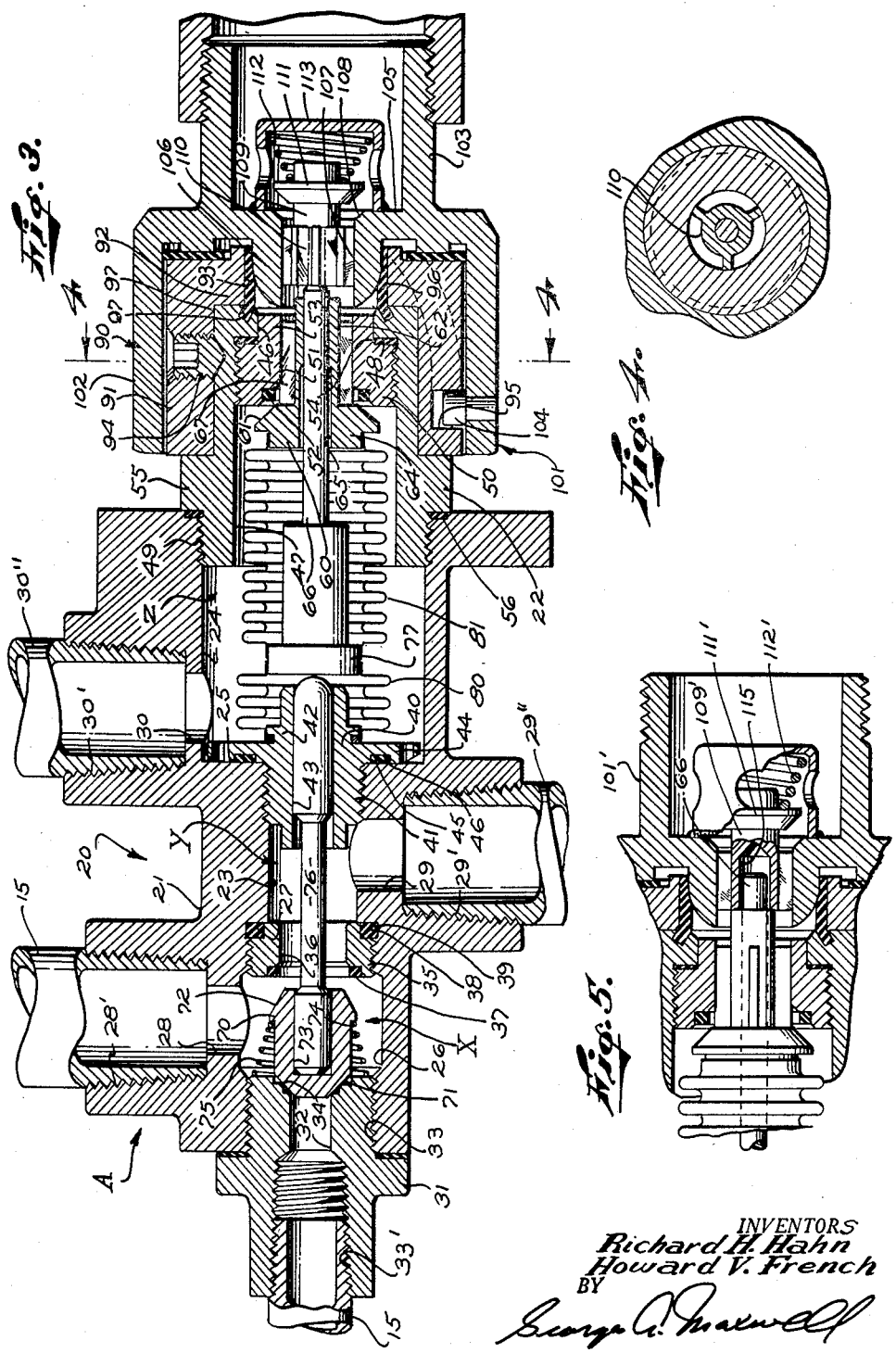

2,916,061
VALVE FOR FILLING, DRAINING, VENTING AND PRESSURE BUILD-UP OF AN OXYGEN SUPPLY TANK

Richard H. Hahn, Burbank, and Howard V. French, Sepulveda, Calif.

Application September 8, 1958, Serial No. 759,663

20 Claims. (Cl. 141—349)

This invention relates to a novel valve construction and is more particularly concerned with a valve adapted to be related to an oxygen supply system, such as is used in aircraft to supply oxygen to the pilots and crew.

The ordinary oxygen supply system for use in aircraft includes an insulated supply tank adapted to handle and carry a volume of liquid oxygen, a filler pipe communicating with the top of the tank and normally closed by means of a manually operable filler valve engaged therein, and an outlet pipe communicating with the bottom of the tank and extending to a station for use. The ordinary system, such as referred to, further includes a pressure build-up means adapted to maintain a predetermined operating pressure in the tank.

The ordinary pressure build-up means involves a pressure build-up line extending between the top of the tank and the outlet pipe, an evaporating coil in the pressure line and suitable pressure regulating and relief valves arranged in the line to maintain the desired pressure in the tank.

In practice, the supply tank of the ordinary oxygen supply system must frequently be filled with a new supply of liquid oxygen. In order to fill the tank, a suitable vent pipe must be connected with the top of the tank, which pipe is provided with a manually operable pressure release or vent valve. The vent valve is adapted to be opened preparatory to filling the tank to relieve the pressure in the tank and thereby make it possible and safe to open the filler pipe.

A suitable manually operable shut-off or pressure build-up valve is provided in the pressure build-up line, adjacent the tank, which valve is closed during the filling operation in order to prevent pressures from building up in the tank during said operation and to also prevent the pressure build-up means from becoming filled with liquid oxygen.

In practice, when it desired to service or work on an oxygen supply system, such as is referred to above, it is necessary that all of the liquid oxygen be drained from the supply tank. In the ordinary or conventional system when it is desired to drain or empty the supply tank, the pressure release valve in the vent pipe is opened, the filler pipe is opened and the liquid oxygen is allowed to percolate or evaporate and leave the system through the filler pipe in the form of gas. The method of exhausting the ordinary oxygen supply system takes many hours, during which time the aircraft to which it is related is grounded and must remain out of service.

In certain systems of the general character referred to, special drain valves are provided in the outlet pipes, which valves are adapted to be manually opened, when the system is pressurized, to drain the liquid from the supply tank more rapidly, preparatory to servicing the system.

In the ordinary or conventional oxygen supply system or systems, such as referred to in the foregoing, the several valves provided to facilitate filling or draining the systems are separate valves arranged in spaced relationship with each other and engaged in separate pipes or lines of the system. These valves are manually operable, and being spaced apart, require the provision of separate access openings in the skin of the aircraft to which each system is related. Still further, in such constructions, great care must be exercised in manipulating the several valves to assume proper and safe operation of the system.

An object of the present invention is to provide a novel, unitary combination fill, pressure build-up and vent valve for use in an oxygen supply system on an aircraft, or the like.

A further object of the present invention is to provide a valve for incorporation in an oxygen supply system which is operable to vent the supply tank and condition the system for filling and which is operable to drain the said supply tank and system.

Another object of this invention is to provide a valve of the character referred to having fill, outlet, vent, gas and pressure build-up ports therein to communicate with the several pipes and lines of the system; and a valve having a first valve member operable to selectively establish open communication between the gas port and the pressure build-up port and between the second valve member adapted to open and close the fill port.

Another object of this invention is to provide novel operating means related to certain ground handling equipment, which means is operable to shift the first and second valve members independently or together, as circumstances require, when said ground handling equipment is connected with the valve construction.

Another object of our invention is to provide a valve construction of the character referred to which reduces the number of access openings to be provided in the skin of the aircraft; and a valve construction which is simple and fool-proof in operation.

An object of the present invention is to provide a valve construction of the character referred to which involves a minimum number of parts, each of which is easy and economical to manufacture.

It is an object of the present invention to provide a valve construction of the character referred to which is highly effective and dependable in operation and which is easy to service and repair.

The various objects and features of our invention will be fully understood from the following detailed description of a typical preferred form and application of our invention, throughout which description reference is made to the accompanying drawings, in which:

Fig. 1 is a diagrammatic view of a typical oxygen supply system with the valve provided by the present invention engaged therein.

Fig. 2 is an enlarged, longitudinal, sectional view of our new valve.

Fig. 3 is a view similar to Fig. 2 showing the valve in a fully actuated position.

Fig. 4 is a transverse sectional view taken as indicated by line 4—4 on Fig. 3.

Fig. 5 is a view of a portion of a modified actuator adapted to connect with the valve to actuate a portion thereof.

Fig. 1 of the drawings is a diagrammatic view of a typical oxygen supply system S such as is used in aircraft, with the valve construction A provided by the present invention engaged therein.

The system S is shown as including, generally, a supply tank 10 adapted to carry a supply of liquid oxyen, a delivery pipe 11 communicating with the bottom of the tank and extending to a suitable station or piece of equipment (not shown), where the oxygen is to be put to use; and pressure build-up means 12 adapted to maintain a predetermined operating pressure in the tank and including, an evaporating coil 14 communicating with the delivery pipe 11, a pressure line 15 extending from the coil to the top of the tank, a pressure regulator 16 in the pressure line and controlling the flow of oxygen from the coil into the tank and a pressure release valve 17 in the pressure line between the pressure regulator and the tank.

When the system S is in operation, the liquid oxygen in the tank 10 evaporates or percolates, generating sufficient operating pressure in the tank to urge the oxygen through the delivery pipe and into the equipment where it is put to use. The delivery pipe is of such length that the oxygen is vaporized before it reaches the said equipment.

When the oxygen is used or consumed at such a rate that normal percolation of the oxygen in the tank 10 cannot maintain sufficient operating pressure, say, for example, 70 p.s.i., the liquid oxygen enters the evaporating coil where it expands into gaseous form and is directed into the top of the tank 10, through the pressure pipe 15 and through the pressure regulator 16, which is set to release or open at 70 p.s.i.

Should the pressure in the tank exceed a predetermined amount, say, for example, 90 p.s.i., the pressure release valve 17 in the pressure line 15 is adapted to open and relieve the excess pressure.

The valve construction A that we provide is adapted to be engaged in the system S referred to above to drain the liquid oxygen from the tank 10, while operating pressure is maintained in the tank, or to vent and relieve the pressure in the tank and condition the system for filling the tank.

The valve A includes an elongate sectional body 20 having inner and outer end sections 21 and 22. The inner end section 21 of the body 20 is an elongate, tubular member having a central longitudinal opening 23, which extends along the central axis of the body, a first counterbore 24 entering the outer end of the section and terminating at a flat bottom 25, a second counterbore 26 entering the inner end of the section and terminating at a flat bottom 27, a lateral gas port 28 entering one side of the body section and communicating with the second counterbore 26 at a point intermediate the ends thereof, a vent port entering the opposite side of the body to communicate with the opening 23 at a point spaced between the counterbores and a flow port 30 entering said first-mentioned side of the body section and communicating with the first counterbore 24.

The ports 28, 29 and 30 are provided with threaded socket 28', 29' and 30' opening to the exterior of the body. The socket 28' threadedly receives the portion of the pressure line 15 extending between the valve and the tank 10. The socket 29' threadedly receives a suitable vent pipe 29'' which opens to atmosphere. The socket 30' threadedly receives a flow pipe 30'' which extends to and connects with the delivery pipe 11 adjacent the point where said delivery pipe communicates with the tank.

The second counterbore 26 entering the inner ends of the section 21 of the body 20 is closed by an elongate head 31 having a central, longitudinally disposed pressure port 32 extending therethrough. The head 31 is threadedly engaged in the outer end of the counterbore, as at 33. The inner portion of the head which projects from the inner end of the body section is interiorly threaded as at 33' to connect with the section of the pressure line 15 of the system S extending from the valve to the evaporating coil 14, as clearly illustrated in Fig. 1 of the drawings.

The outer end of the head 31 terminates within the counterbore 26 and is provided with an annular valve seat 34 adapted to cooperatively receive a valve member 70 of the construction, as will hereinafter be described.

A partition 35 having a central longitudinally disposed by-pass port 36 is threadedly engaged in the said second counterbore to seat on the bottom 27 thereof and to occur in spaced relationship from the seat 34 at the outer end of the head 31. The partition 35 cooperates with the head 31 to establish a fluid chamber X with which the gas port 28 communicates.

The partition 35 is provided with an annular inwardly disposed valve seat 37, which seat opposes the seat 34 on the head 31 and is adapted to cooperatively receive the previously referred to valve member 70 as will hereinafter be described.

In the case illustrated, the partition 35 is provided with a radially and longitudinally outwardly opening annular groove 38 in which a sealing ring 39 is engaged to seal between the bottom 27 of the counterbore 26 and the partition.

A second partition 40 is engaged in the section 21 of the body 20 to occur at the bottom of the first mentioned counterbore 24 entering the outer end of the said section.

The partition 40 is an elongate, cylindrical member having inner and outer end portions 41 and 42, a central longitudinal bore 43 and a central, radially outwardly projecting flange 44.

The inner end portion 41 of the partition 40 is threadedly engaged in the opening 23 in the body section 21, as illustrated, and so that the flange 44 establishes flat seating engagement on the bottom 25 of the counterbore 23.

The flange is provided with an annular longitudinally inwardly opening annular groove 45 in which a sealing ring 46 is engaged to seal between the body section and the partition.

The bore 43 in the partition 40 is adapted to slidably receive a valve stem 76 for operating the valve member 70 in the chamber X, as will hereinafter be described.

The inner end of the partition 40 is spaced from the partition 35 and cooperates therewith and with the opening 23 to establish a chamber Y with which the vent port 29 communicates.

The outer section 22 of the body 20 is an elongate, cylindrical member having a central opening 46 extending therethrough and a counterbore 47 entering its inner end and terminating at a flat bottom 48. The inner end portion of the section 22 is threadedly engaged in the outer end of the counterbore 24 in the section 21, as shown at 49 and so that the counterbores 47 and 24 in the sections are in open communication with each other and establish a chamber Z with which the flow port 30 communicates.

A cylindrical head-like insert 50 is threadedly engaged in the counterbore 47 of the body section 22 to seat on the bottom 48 thereof and is provided with a central longitudinal fill port 51 and an annular, inwardly disposed valve seat 52. The insert 50 is provided with an extension 53 which extends through the opening 46 in the section 22 to terminate adjacent the outer end thereof.

A suitable gasket 54 is engaged between the insert 50 and the bottom 48 of the counterbore 47 to seal between the insert and the body section 22.

In practice, the section 22 of the body is provided with a radially outwardly projecting flange 55 to engage the outer end of the section 21 and limit engagement of the section 22 in the section 21 and between which a suitable seal 56 is arranged to seal between the sections.

Arranged within the chamber Z is a longitudinally shiftable valve member 60, which member is adapted to cooperatively engage the seat 52 of the insert 50 and control the flow of fluid through the fill port 51 therein. The valve member 60 is a substantially disc-shaped member having a radially and longitudinally outwardly inclined sealing face 61 opposing the seat 52 of the insert, an elongate stem 62 projecting outwardly therefrom and projecting freely through the inlet port 51 in the insert 50, the stem to terminate forwardly or outwardly of the insert. The valve member 60 is further provided with an inwardly projecting, cylindrical base 64 and a central longitudinal opening 65 through which an operating rod 66 for the valve member 70 is slidably engaged.

The stem 62 is provided with a plurality of circumferentially spaced, longitudinal vanes 67 about its exterior, which vanes serve to guide the stem in the port 51 and allow for the flow of fluid through the port and by the stem when the valve is open.

The valve member 70 referred to above and arranged in the chamber X is an elongate, cylindrical member having tapered seats 71 and 72 at its inner and outer ends and a central, outwardly opening socket 73 in its outer end. The member 70 is further provided with an inwardly faced shoulder 74 about its periphery to be engaged by a suitable compression spring 75 arranged within the chamber X to act between the outer end of the head 31 and the valve member and to normally yieldingly urge the said valve member outwardly and into seated sealing engagement on the seat 37 of the partition 35.

The valve stem 76 referred to above is a simple, elongate, rod-like element having one end slidably engaged through the opening 43 in the second partition 40 to project outwardly therefrom and into the chamber X where it opposes and is engaged by the inner end of the operating rod 66. The inner end of the operating rod 66 is provided with a cylindrical head 77 against which the stem 76 bears.

The construction that we provide further includes, a tubular bellows seal 80 between the head 77 on the operating stem 66 and the forward portion 42 of the second mentioned partition 40, and a second tubular bellows seal 81 between the boss 64 on the valve member 60 and the head 77 on the operating stem. The seal 80 is adapted to seal between the chambers Y and Z, that is, prevent the flow of fluid or the transfer of pressure between the said chamber through the opening 43 in the partition 40. The seal 81 is adapted to seal around the operating rod 66 and prevent the flow of fluid or the escape of pressure from the chamber Z through the opening 65 in the valve member 60.

In addition to the foregoing, the bellows seals 80 and 81 are established of resilient material and are arranged with the construction under compression and so that they serve to normally yieldingly urge the valve member 60 into seated sealing engagement with the insert 50, to close the fill port 51.

In the preferred carrying out of the invention the several valve seats of the construction are provided with annular grooves in which suitable sealing rings are engaged and which serve to assure a fluid tight seal about the valve members related thereto when said members are in engagement on the seats.

In practice, the spring rate, the longitudinal extent and the effective cross-sectional area of the bellows 80 and 81 are proportioned so that the fluid pressure in the chamber Z acting on the bellows does not adversely affect the operation of the construction.

With the valve construction thus far described, it will be apparent that the valve members 60 and 70 can be operated separately or at the same time. When the valve member 70 is in its normal position, as illustrated in Fig. 2 of the drawings, communication between the chambers X and Y is closed and open communication is maintained between the gas port 28 and the pressure port 32, thereby maintaining the pressure build-up means 12 of the system S in operation or service. When the valve member 70 is urged out of engagement with the seat 37 of the portion 35 and into sealing engagement with the seat 34 of the head 31, as illustrated in Fig. 3 of the drawings and as by engaging and urging the operating rod 66 of the construction inwardly, the pressure port 32 is closed and open communication is established between the chambers X and Y and the gas port 28 and vent port 29 thereby placing the pressure build-up means out of service and venting the storage tank 10.

When the valve member 60 is in its normal position, as illustrated in Fig. 2, the fill port 51 is closed and the flow of liquid oxygen through the chamber Z and the flow port 30, communicating therewith, is prevented. When the valve member 60 is urged out of engagement with the seat 52 of the insert 50, as by urging the stem 63 thereon, inwardly, the fill port 51 is opened and the liquid oxygen handled by the system S is free to flow therethrough, through the chamber Z, flow port 30 and the flow pipe 30″ which establishes open communication between the valve and the tank.

In practice, the operating rod 66 for the valve member 70 projects outwardly from the stem 63 on the valve member 60 with the result that when the said rod and stem are urged inwardly, the rod 66 is engaged first and the valve 70 is actuated to vent the tank 10, before the stem 63 on the valve 60 is open. The above sequence of operation is extremely important when it is desired to fill the tank, since should the tank be pressurized when the valve 60 is open, the liquid oxygen in the system would be urged outwardly through the construction and into the ground handling equipment which is connected therewith and in a manner that might create great damage.

When it is desired to drain the system S of liquid oxygen, the valve member 70 is left in its unactuated or normal position and the valve member 60 is shifted to open the fill port 51. When the valve construction that we provide is actuated in the manner set forth above, it will be apparent that the system S remains pressurized and the liquid oxygen therein is urged from the tank through the flow line 30″, port 30 and out through the fill port 51 under pressure.

By following the above procedure, the system S can be drained in a very short period of time.

The present invention further includes the provision of a suitable actuating means 90 adapted to simultaneously connect the valve construction with suitable ground handling equipment and actuate the valve member 70 and/or the valve member 60.

In practice, the ground handling equipment might include a storage tank filled with liquid oxygen and having a delivery hose connected therewith and to which the actuating means that we provide is related. Since the ground handling equipment can vary widely in form and construction and does not materially affect the present invention, we have chosen not to illustrate such a piece of equipment.

The actuating means 90 that we provide is shown as including an elongate, cylindrical collar 91 engaged about the outer end of the body to project outwardly therefrom and provided with an annular, radially inwardly projecting flange 92 at its outer end to overlie the outer end of the body and define a longitudinally outwardly opening socket 93. The collar 91 is fixed to the body by means of a suitable set screw 94. The collar is provided with a suitable bayonet type slot 95 about its exterior.

In the preferred carrying out of the invention and as illustrated in the drawings, the socket 93 is provided with a resilient sleeve 96, the inner end of which is shown anchored in an annular groove 97 provided in the other terminal end of the body 20.

The collar 91 normally receives an inwardly opening cup-shaped cap 98, which cap is provided with a radially inwardly projecting pin 99 adapted to slidably engage in the slot 96 in the collar and maintain the cap engaged thereon. The cap is shown provided with suitable spring means 100 to act between the outer end of the collar and the bottom of the cap to yieldingly maintain the pin 99 in pressure engagement in the slot 95 and so that the cap will not become displaced as a result of vibrations and the like.

The means 90 further includes a coupling member 101 (see Fig. 3 of the drawings), which member is adapted to be connected to the end of a hose extending from a piece of grounding handling equipment (not shown). The coupling member 101 is shown as involving an elongate tubular shell having an enlarged inner end 102 and a reduced outer end 103. The inner end 102 of the shell is adapted to slidably receive the collar 91 and is provided with a radially inwardly projecting pin 102 adapted to engage in the slot 95 in the collar. The outer end 103 of the shell is adapted to connect with the hose extending from the ground equipment. The member 101 further includes a partition 105 intermediate its ends and having a central, inwardly projecting boss 106 thereon to slidably enter the socket 96 of the collar 91 and seal with the sleeve 96 therein. The partition 105 and the boss 106 are provided with a central bore 107 in which the stem and rod 63 and 66 of the valve mechanism freely project. The bore 107 terminates at its outer end at an annular valve seat 108.

Slidably engaged in the bore 107 is an elongate, substantially cylindrical slide 109 having circumferentially spaced, longitudinally disposed fluid conducting grooves 110 in its exterior. The inner end of the slide opposes the outer ends of the rod 66 of the valve, while the outer end carries a valve member 111 adapted to normally engage the seat 108.

The valve member 111 is normally urged into engagement on the seat by a compression spring 112 carried by a rearwardly projecting cage 113 on the partition.

The spring 112 is of sufficient strength so that when the coupling member 101 is engaged with the valve construction, valve member 70 is urged open by the slide 109. When the valve member 70 engages the seat 34, further inward movement thereof, and of the rod 66 is prevented, further inward engagement of the coupling member 101 onto the construction causes the valve member 111 of the coupling, stopped against the rod 66, to unseat thereby allowing for the free flow of fluid through the coupling member. The fluid under pressure and acting upon the valve member 60 urges the valve member 60 open and allows for the free flow of fluid into and through the valve construction.

The coupling member 101 is such that when it is related to the valve construction, as illustrated in Fig. 3 of the drawings, both of the valves 60 and 70 are open.

When it is desired to operate the valve construction in a manner so that only the valve 60 is open, a modified coupling member 101', a portion of which is illustrated in Fig. 5 of the drawings, is provided.

The modified coupling member 101' is substantially the same as the member 101, except that the inner end of the slide 109' is provided with a socket opening 115 and into which the outer end of the rod 66 freely projects. With this construction, it will be apparent that the stem 63 is engaged by the slide and the valve member 60 unseated by the coupling member 101'.

The member 101 is adapted to be employed when it is desired to vent and fill the tank 10 of the system S while the member 101' is adapted to be employed when it is desired to drain the tank 10 of the system S, while it is pressurized.

The spring 112' of the coupling member 101' is of such rate or strength that it normally overcomes the resistance of the bellows and is such that when the fluid pressure in the ground handling equipment exceeds the fluid pressure in the valve and a reverse flow of fluid will supplant the action of the spring 112 and causes the valve member 111' to close against the resistance of the bellows.

It is to be understood that the coupling members 101 and 101' can vary widely in form and construction and that the particular constructions illustrated are only typical of the type of coupling constructions that can be employed.

Having described only a typical preferred form and application of our invention, we do not wish to be limited or restricted to the specific details herein set forth, but wish to reserve to ourselves any modifications or variations that may appear to those skilled in the art and fall within the scope of the following claims:

Having described our invention we claim:

1. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member.

2. A valve of the character referred to including, an elongate body defining an inner chamber, a central chamber and an outer chamber, a pressure port, a gas port and a by-pass port communicating with the inner chamber, said pressure and by-pass ports being in axial alignment and said by-pass port communicating with said central chamber, a vent port communicating with said central chamber, a flow port and a fill port communicating with the outer chamber, said fill port being in axial alignment with the pressure on the by-pass ports, a longitudinally shiftable valve member having a tubular operating stem in the outer chamber, means normally yieldingly urging the said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber and into the outer chamber, an elongate operating rod slidably engaged in the tubular stem and having an outer end projecting from the outer end of the tubular valve stem and having an inner end engaging the operating stem of said second valve member.

3. A valve of the character referred to including, an elongate body defining three longitudinally spaced chambers, there being an inner chamber, a central chamber and an outer chamber, a by-pass port establishing communication between said inner and central chambers, a vent port communicating with the said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, and sealing means between said operating rod and the first valve member to prevent the flow of fluid in the outer chamber through said tubular valve stem.

4. A valve of the character referred to including, an elongate body defining an inner chamber, a central chamber and an outer chamber, a pressure port, a gas port and a by-pass port communicating with the inner chamber, said pressure and by-pass ports being in axial alignment and said by-pass port communicating with said central chamber, a vent port communicating with said central chamber, a flow port and a fill port communicating with the outer chamber, said fill port being in axial alignment with the pressure on the by-pass ports, a longitudinally shiftable valve member having a tubular operating stem in the outer chamber, means normally yieldingly urging the said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber and into the outer chamber, an elongate operating rod slidably engaged in the tubular stem and having an outer end projecting from the outer end of the tubular valve stem and having an inner end engaging the operating stem of said second valve member, and sealing means between said operating rod and the first valve member to prevent the flow of fluid in the outer chamber through said tubular valve stem.

5. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, a first sealing means between said operating rod and the first valve member to prevent the flow of fluid in the outer chamber through said tubular valve stem and a second sealing means between the operating rod and the body to prevent the flow of fluid between the central and outer chambers.

6. A valve of the character referred to including, an elongate body defining an inner chamber, a central chamber and an outer chamber, a pressure port, a gas port and a by-pass port communicating with the inner chamber, said pressure and by-pass ports being in axial alignment and said by-pass port communicating with said central chamber, a vent port communicating with said central chamber, a flow port and a fill port communicating with the outer chamber, said fill port being in axial alignment with the pressure on the by-pass ports, a longitudinally shiftable valve member having a tubular operating stem in the outer chamber, means normally yieldingly urging the said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber and into the outer chamber, an elongate operating rod slidably engaged in the tubular stem and having an outer end projecting from the outer end of the tubular valve stem and having an inner end engaging the operating stem of said second valve member, a first bellows-type sealing means between said operating rod and the first valve member to prevent the flow of fluid in the outer chamber through said tubular valve stem and a second bellows-type sealing means between the operating rod and the body to prevent the flow of fluid between the central and outer chambers.

7. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member.

8. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, and sealing means between said operating rod and the first valve member to prevent the flow of fluid in the outer chamber through said tubular valve stem.

9. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, a first bellows-type sealing means between said operating rod and the first valve member to prevent the flow of fluid into the outer chamber through said tubular valve stem and a second sealing means between the operating rod and the outermost partition adapted to prevent the flow of fluid between the central and outer chambers.

10. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, a first bellows-type sealing means between said operating rod and the first valve member to prevent the flow of fluid into the chamber through said tubular valve stem and a second bellows-type sealing means between the operating rod and the outermost partition adapted to prevent the flow of fluid between the central and outer chambers.

11. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, a first bellows-type sealing means between said operating rod and the first valve member to prevent the flow of fluid into the chamber through said tubular valve stem and a second bellows-type sealing means between the operating rod and the outermost partition adapted to prevent the flow of fluid between the central and outer chambers, said bellows-type sealing means being resilient and serving to normally yieldingly urge the first valve member outwardly to close the filler port.

12. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, the pressure, gas, vent and flow ports each having pipe connecting means related thereto.

13. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, and an operating coupling means adapted to connect a fluid conducting element with the filler port and initially shift the second valve member and subsequently shift the first valve member inwardly.

14. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, and an operating coupling means adapted to connect a fluid conducting element with the filler port and shift the second valve member inwardly.

15. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, and an operating coupling means adapted to connect a fluid conducting element with the filler port and initially shift the second valve member and subsequently shift the first valve member inwardly and including an elongate, tubular member having inner and outer ends, said outer end of the member connected with the fluid conducting element, means releasably securing the inner end of the tubular member to the outer end of the body, and a centrally disposed element arranged within the tubular member and adapted to engage the outer ends of the tubular stem and the operating rod and to shift the said stem and rod inwardly when the tubular member is engaged on the body.

16. A valve of the character referred to including, an elongate body defining three longitudinally spaced chambers, there being an inner chamber, a vertical chamber and an outer chamber, a pressure port, a gas port and a by-pass port communicating with said inner chamber, said by-pass port establishing communication between said inner and central chambers, a vent port communicating with said central chamber, a flow port and a fill port communicating with the outer chamber, a valve member in the outer chamber to normally close the fill port and having a tubular operating stem projecting through said fill port to terminate at the exterior of the body, a second valve member in the inner chamber adapted to normally close the by-pass port and shiftably to close said pressure port, an operating stem on said second valve member and extending into the outer chamber and an operating rod slidably engaged in the tubular stem of the first valve member and having an outer end terminating outwardly of the said tubular stem and an inner end engaging the stem of the second valve member, and an operating coupling means adapted to connect a fluid conducting element with the filler port and shift the second valve member inwardly and including an elongate, tubular member having inner and outer ends, said outer end of the member connected with the fluid conducting element, means releasably securing the inner end of the tubular member to the outer end of the body, and a centrally disposed, tubular element arranged within the tubular member and adapted to freely receive the rod and to engage the outer end of the tubular stem and to shift the said stem inwardly when the tubular member is engaged on the body.

17. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers. said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, and an operating coupling means adapted to connect a fluid conducting element with the filler port and initially shift the second valve member and subsequently shift the first valve member inwardly, and including, an elongate, tubular member having inner and outer ends, said outer end of the member connected with the fluid conducting element, means releasably securing the inner end of the tubular member to the outer end of the body, and a centrally disposed element arranged within the tubular member and adapted to engage the outer ends of the tubular stem and the operating rod and to shift the said stem and rod inwardly when the tubular member is engaged on the body.

18. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, and an operating coupling means adapted to connect a fluid conducting element with the filler port and shift the second valve member inwardly, and including, an elongate, tubular member having inner and outer ends, said outer end of the member connected with the fluid conducting element, means releasably securing the inner end of the tubular member to the outer end of the body, and a centrally disposed, tubular element arranged within the tubular member and adapted to freely receive the rod and to engage the outer end of the tubular stem and to shift the said stem inwardly when the tubular member is engaged on the body.

19. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, and an operating coupling means adapted to connect a fluid conducting element with the filler port and initially shift the second valve member and subsequently shift the first valve member inwardly, and including, an elongate, tubular member having inner and outer ends, said outer end of the member connected with the fluid conducting element, means releasably securing the inner end of the tubular member to the outer end of the body, a partition in the element intermediate the ends thereof and having a port therein, a longitudinally shiftable slide carried by the element and adapted to engage the outer ends of the tubular valve stem and operating rod, a valve member on said slide to normally close the port in the partition and spring means normally urging the valve member inwardly and into sealed engagement in the port and of sufficient rate to overcome the resistance of the means urging the first and second valve members of the valve construction outwardly when the member is advanced into engagement with the body, said valve member of the coupling means being urged out of seated engagement with the port in the partition when the second valve member seats in the pressure port of the valve and inward movement of the operating rod is stopped.

20. A valve of the character referred to including, an elongate, tubular body, having inner and outer ends, a head closing the inner end and having a pressure port therein, a head closing the outer end and having a fill port therein, a pair of longitudinally spaced partitions in the body and defining three chambers, there being an inner chamber and central chamber and an outer chamber, the innermost portion having a by-pass port to establish open communication between the inner and central chambers, said body having a lateral gas port communicating with the inner chamber, a lateral vent port communicating with the central chamber and a lateral flow port communicating with the outer chamber, said pressure, by-pass and fill ports being in axial alignment, a longitudinally shiftable valve member having a tubular operating stem in the outer chamber, means normally yieldingly urging said valve member outwardly to close the fill port, said operating stem projecting outwardly through the fill port to terminate at the exterior of the body, a second longitudinally shiftable valve member in the inner chamber and adapted to be shifted into and out of engagement with the pressure and by-pass ports, means normally yieldingly urging said second valve member into engagement with said by-pass port, an operating stem projecting forwardly from the second valve member through the central chamber, an opening in the outermost partition and into the outer chamber, an elongate operating rod slidably engaged in the tubular stem and having an outer end projecting from the outer end of the tubular valve stem and having an inner end engaging the operating stem of said second valve member, a first sealing means between said operating rod and the first valve member to prevent the flow of fluid into the outer chamber through said tubular valve stem and a second sealing means between the operating rod and the outermost partition adapted to prevent the flow of fluid between the central and outer chambers, and an operating coupling means adapted to connect a fluid conducting element with the filler port and shift the second valve member inwardly, and including, an elongate, tubular member having inner and outer ends, said outer end of the member connected with the fluid conducting element, means releasably securing the inner end of the tubular member to the outer end of the body, a partition in the element intermediate the ends thereof and having a port therein, a longitudinally shiftable, tubular slide carried by the element and adapted to freely receive the operating stem and to engage the outer end of the tubular valve stem, a valve member on said slide to normally close the port in the partition and spring means normally urging the valve member inwardly and into seated engagement in the port and of sufficient rate to initially overcome the resistance of the bellows urging the first valve member outwardly when the member is advanced into engagement with the body, the spring rate of the bellows increasing as the bellows is compressed, to overcome the resistance of the spring means in the coupling and thereby permitting the valve of the coupling to open.

No references cited.